United States Patent
Peng et al.

(10) Patent No.: US 8,359,493 B2
(45) Date of Patent: Jan. 22, 2013

(54) MECHANISM TO PROVIDE ASSURED RECOVERY FOR DISTRIBUTED APPLICATION

(75) Inventors: Hailin Peng, Beijing (CN); Zhenghua Xu, Beijing (CN); Victor Liu, Beijing (CN)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 12/845,981

(22) Filed: Jul. 29, 2010

(65) Prior Publication Data

US 2012/0030513 A1 Feb. 2, 2012

(51) Int. Cl.
*G06F 11/00* (2006.01)
(52) U.S. Cl. ............ 714/15; 714/38.1; 714/4.1; 717/124
(58) Field of Classification Search ........................ None
See application file for complete search history.

(56) References Cited

U.S. PATENT DOCUMENTS

| | | | |
|---|---|---|---|
| 2006/0075148 A1* | 4/2006 | Osaki | 710/5 |
| 2006/0123208 A1* | 6/2006 | Johnson | 711/162 |
| 2007/0079171 A1* | 4/2007 | Aidun | 714/6 |
| 2007/0168500 A1* | 7/2007 | D'Souza et al. | 709/224 |
| 2009/0113233 A1* | 4/2009 | Phan | 714/4 |

* cited by examiner

*Primary Examiner* — Scott Baderman
*Assistant Examiner* — Jason Bryan
(74) *Attorney, Agent, or Firm* — Womble Carlyle Sandridge & Rice, LLP

(57) ABSTRACT

A system and method is provided for providing assured recovery for a distributed application. Replica servers associated with the distributed application may be coordinated to perform integrity testing together for the whole distributed application. The replica servers connect to each other in a manner similar to the connection between master servers associated with the distributed application, thereby preventing the replica servers from accessing and/or changing application data on the master servers during integrity testing.

17 Claims, 12 Drawing Sheets

MECHANISM TO PROVIDE ASSURED RECOVERY FOR DISTRIBUTED APPLICATION

TECHNICAL FIELD

The invention relates to the field of disaster recovery and high availability systems and products. More particularly, the invention relates to disaster recovery and high availability systems and products for distributed applications.

BACKGROUND

Integrity testing (also known as assured recovery) is one part of a disaster recovery (DR) or high availability (HA) solution. A typical DR or HA system for a specific application (for example, a standalone application) may include two servers, one of which is a master (production) server, and the other is a replica (backup) server. The application usually runs on the master server. The integrity testing procedure/mechanism may be performed to assist with recovery of the master server in case of failure (for example, hardware failure of the master server) and/or planned maintenance downtimes. The integrity testing procedure/mechanism may be used to guarantee that the application will run properly at the master server after the backed up or replicated data of the application is restored to the master server from the replica server. Without the integrity testing procedure/mechanism, a user may not be able to ensure that the application can still work at the master server after recovery from failure.

More and more mission critical applications in an enterprise environment, for example, Microsoft SharePoint, Microsoft Exchange, Microsoft Dynamics, etc., are architecturally distributed today. Implementing assured recovery for distributed applications is technically difficult and challenging. There is a need for a mechanism for providing assured recovery for distributed applications.

These and other drawbacks exist.

SUMMARY

In some implementations, the invention relates to a system and method for providing assured recovery for a distributed application. A central management module, which may be referred to as a distributed integrity testing coordinator, may implement central management logic to coordinate at least two replica servers associated with the distributed application to perform integrity testing together for the whole distributed application. As such, the replica servers may act as a logical unit.

The replica servers may substantially simulate the environment in which the master servers associated with the distributed application operate. This means that the replica servers may start the application/application services and connect to each other (rather than/instead of the current active master servers). This may prevent replica servers from accessing and/or changing application data on the master servers during integrity testing, and may guarantee that various components of the distributed application operate normally after recovery from a failover or other outage.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
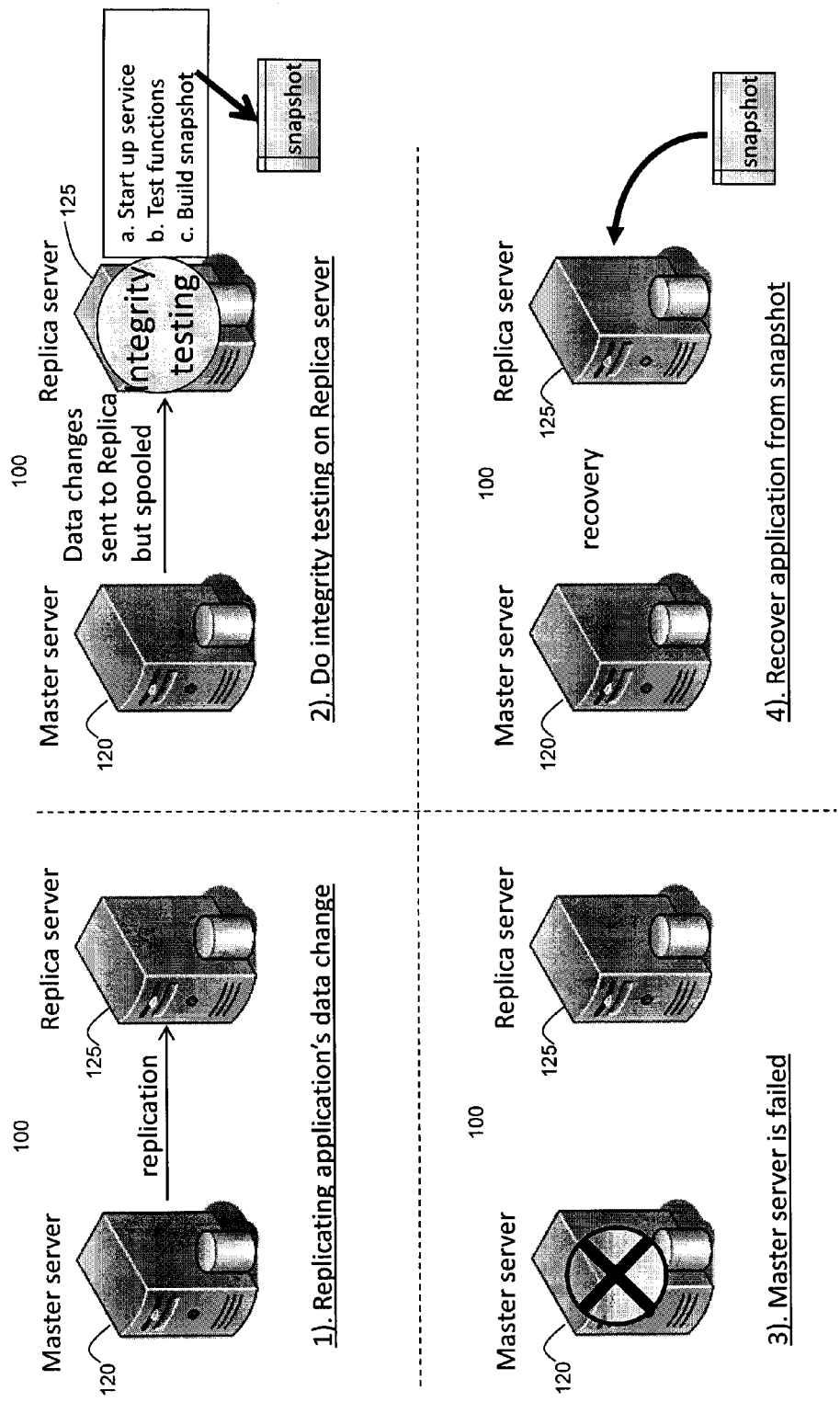
FIG. 1 illustrates an exemplary disaster recovery or high availability system, according to various aspects of the invention.

FIG. 1 is an exemplary illustration of a disaster recovery (DR) or high availability (HA) system 100 for providing assured recovery for an application (for example, a standalone application). System 100 may include at least one master server 120, and at least one replica server 125. The application usually runs on the master server 120 under normal conditions (for example, no failure conditions). In some implementations, master server 120 may transfer changes of application data as they occur to corresponding replica server 125. In other words, application data on master server 120 may be replicated to replica server 125 in real-time. In some implementations, master server 120 may transfer changes of application data at different intervals.

Integrity testing may be performed on replica server 125 to assist with recovery of master server 120 in case of failure (for example, hardware failure of master server 120). Integrity testing may bring up the application and services associated with the application on replica server 125 to simulate a substantially similar environment as master server 120, and may then perform testing to check whether the application/application service is "working well" with the latest replicated application data. In other words, testing to check whether the application/application service is "working well" includes determining whether one or more components of the application/application service are functioning substantially the same on replica server 125 as on the master server 120 using the replicated data at the replica server 125.

A snapshot (for example, shadow copy) of the tested replicated application data may be created on replica server 125 during the integrity testing procedure. The application on master server 120 may continue to execute during the integrity testing procedure, thereby guaranteeing business continuity. When master server 120 does fail, the application may be recovered using the snapshot created on replica server 125.

Each replica server 125 may include a processor 220, circuitry and/or other hardware operable to execute computer-readable instructions. Each master server 120 may also include a processor (not shown), circuitry and/or other hardware operable to execute computer-readable instructions. According to one aspect of the invention, system 100/servers 120, 125 may include one or more tangible computer-readable storage media configured to store one or more software agents/modules, wherein the software agents/modules include computer-readable instructions that when executed by the processor cause the processor to perform the functions described herein. According to one implementation, replica server 125 may comprise computer hardware programmed with a computer application having one or more software modules that enable the various features and functions of the invention. The one or more software modules may include one or more of an integrity tester 210, a file system filter driver 230, data replicator 240, and/or other software modules.

Figure 2A:
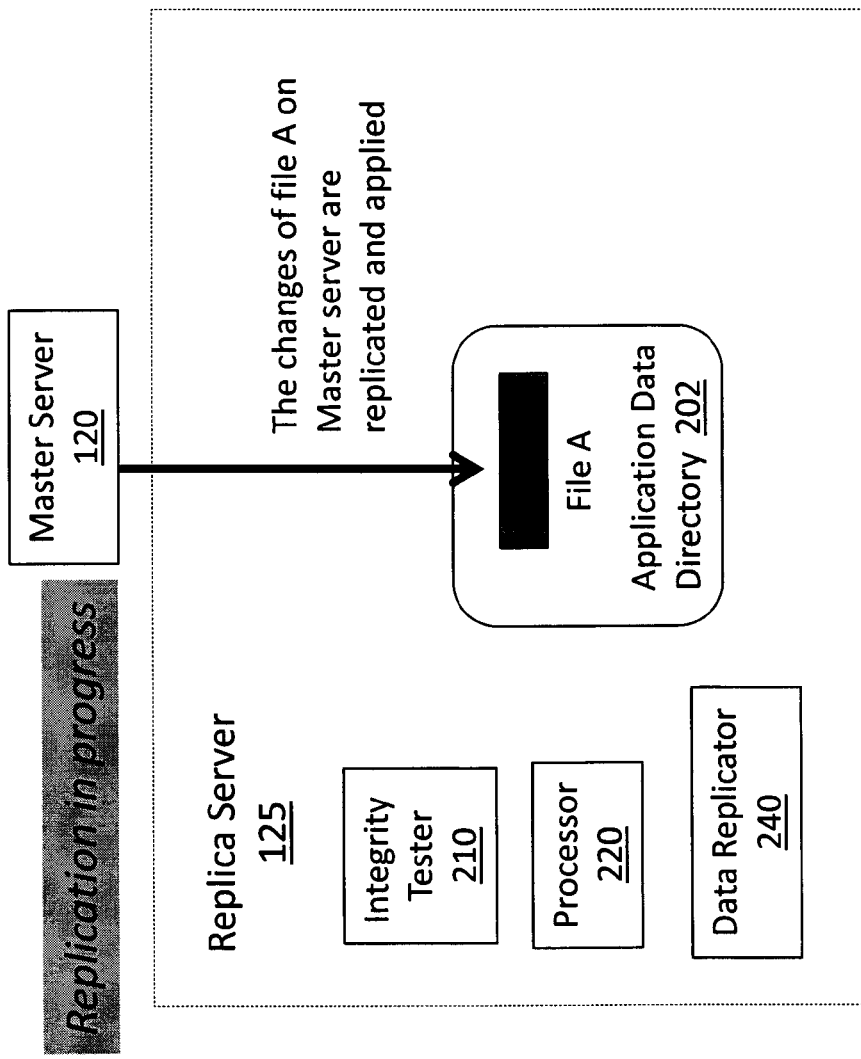
FIG. 2a illustrates an exemplary data replication process, according to various aspects of the invention.

FIG. 2a illustrates replication of application data. Changes to application data at master server 120 may be replicated to corresponding replica server 125. Data replicator 240 may replicate the application data changed at master server 120. Data replicator 240 may receive changes made to application data on master server 120. In one implementation, master server 120 may include a software agent (not shown) executing on master server 120 that may capture changes made to application data (for example, file A on master server) and may transfer the changes to replica server 125 in real-time. Data replicator 240 may receive the changes and may store the replicated application data in application data directory 202 on replica server 125. As would be appreciated, replicated application data may be stored at any location accessible by replica server 125.

FIGS. 2b-2f illustrate an integrity testing procedure performed on replica server 125. Once integrity testing is triggered/initiated, integrity tester 210 may perform testing to determine whether the application/application service is working well with the latest replicated application data in application directory 202. During the integrity testing procedure, any changes made to the application data on master server 120 may be replicated to replica server 125, but may be spooled in a temporary spool directory 206. In other words, data replicator 240 may continue to replicate the changed application data but may not apply the changes to the file in application data directory 202. Instead, data replicator 240 may spool the replicated application data into spool directory 206. This may ensure that any application data change that occurs on master server 120 after the integrity testing is initiated does not impact the replica server testing environment and ensures that application data changes during the integrity testing are still captured.

Figure 2B:
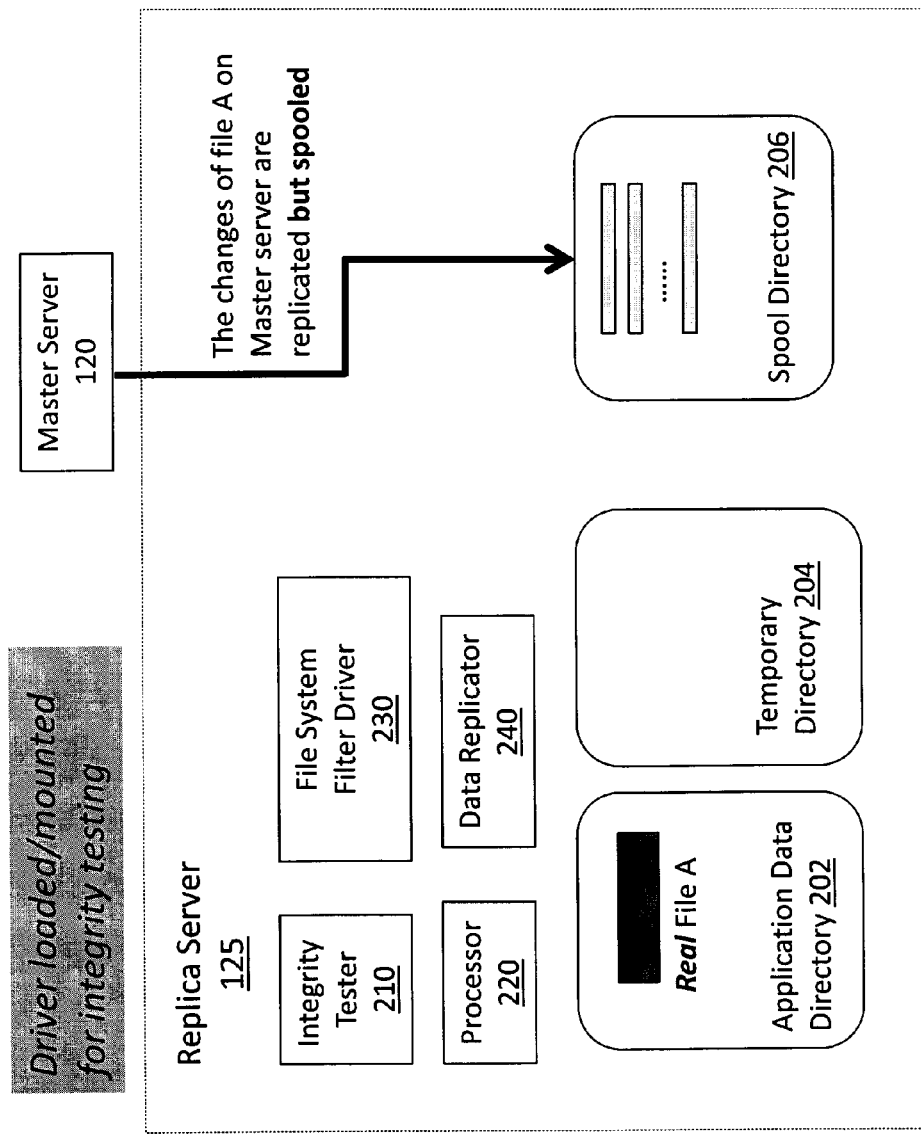
FIGS. 2b-2f depict an exemplary integrity testing procedure, according to various aspects of the invention.

Integrity tester 210 may load/mount file system filter driver 230 and may create a temporary directory 204, as shown in FIG. 2b, for example. Integrity tester 210 may start up the application/application services that will access the replicated application data in application data directory 202 on replica server 125. Integrity tester 210 may launch and execute testing logic to verify if the application is functioning/working well. In one implementation, the testing logic may be executed to test the application services started on the replica server. The testing logic may include, among other things, application specific checks, actions, or tests that may be performed to determine whether the application is functioning well. If any of the tests fail, the testing is treated as failed. Otherwise, the application is determined to be functioning well. As would be appreciated, testing may be treated as failed according to additional or otherwise different rules. For example, a threshold percentage of failed tests may cause the testing to be treated as failed rather than a single failed test causing testing to be treated as failed. The testing logic used may be relevant to the type of application on which integrity testing is being performed.

Figure 2C:
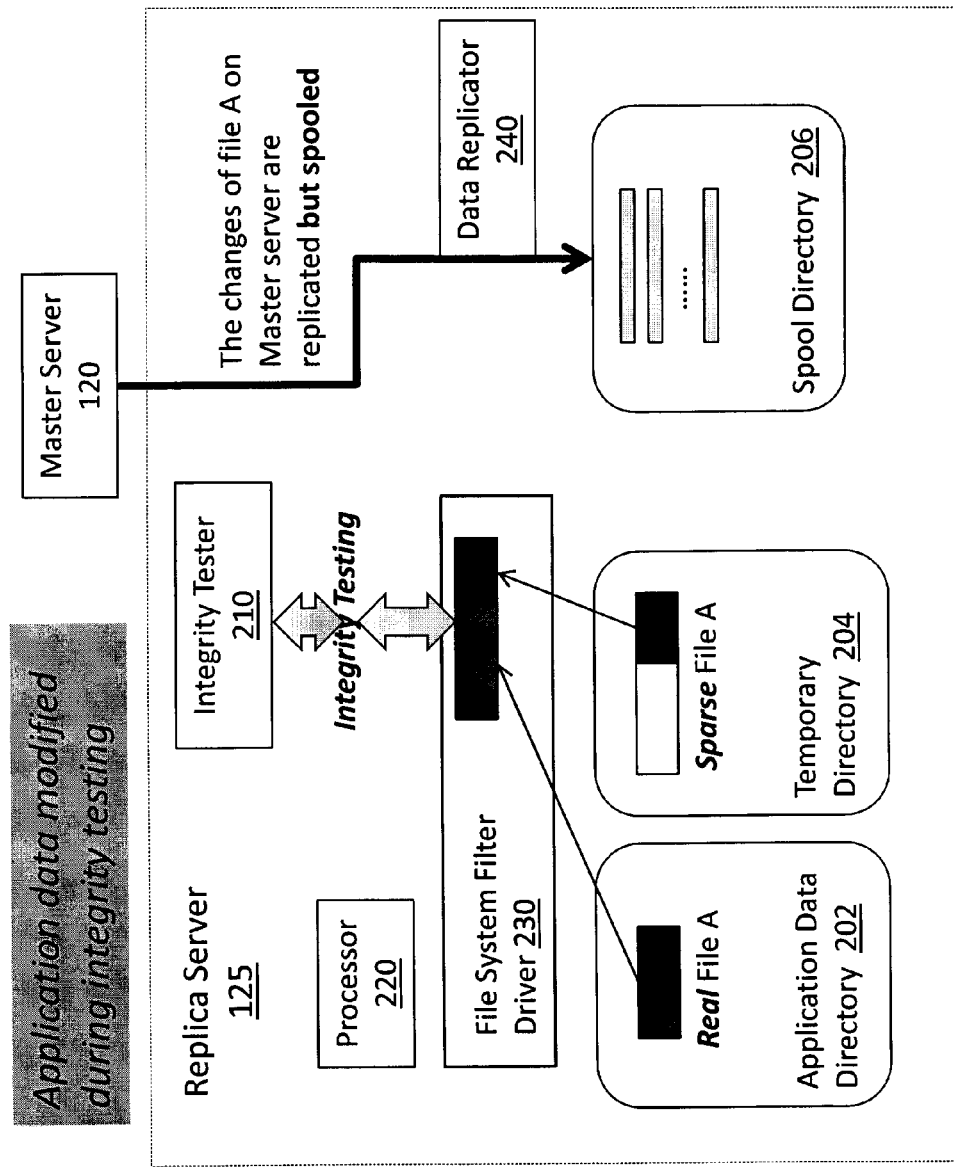

When the application/application services are started and testing logic is executed, some temporary testing data might be created which may corrupt the replicated application data in application data directory 202. File system filter driver 230 may prevent the replicated application data from being modified which may guarantee that replication can be resumed after integrity testing is completed. In one implementation, file system filter driver 230 may capture any data modifications to the replicated application data stored in application data directory 202 (or any other protected directory) due to the execution of testing logic, and may re-direct the modifications to another temporary location, for example, temporary directory 204. In one implementation, any modifications to file A may be captured by file system filter driver 230, and may be re-directed to a sparse file in temporary directory 204, as depicted in FIG. 2c, for example. The testing logic/integrity tester 210 may be unaware of the functions performed by file system filter driver 230.

Figure 2D:
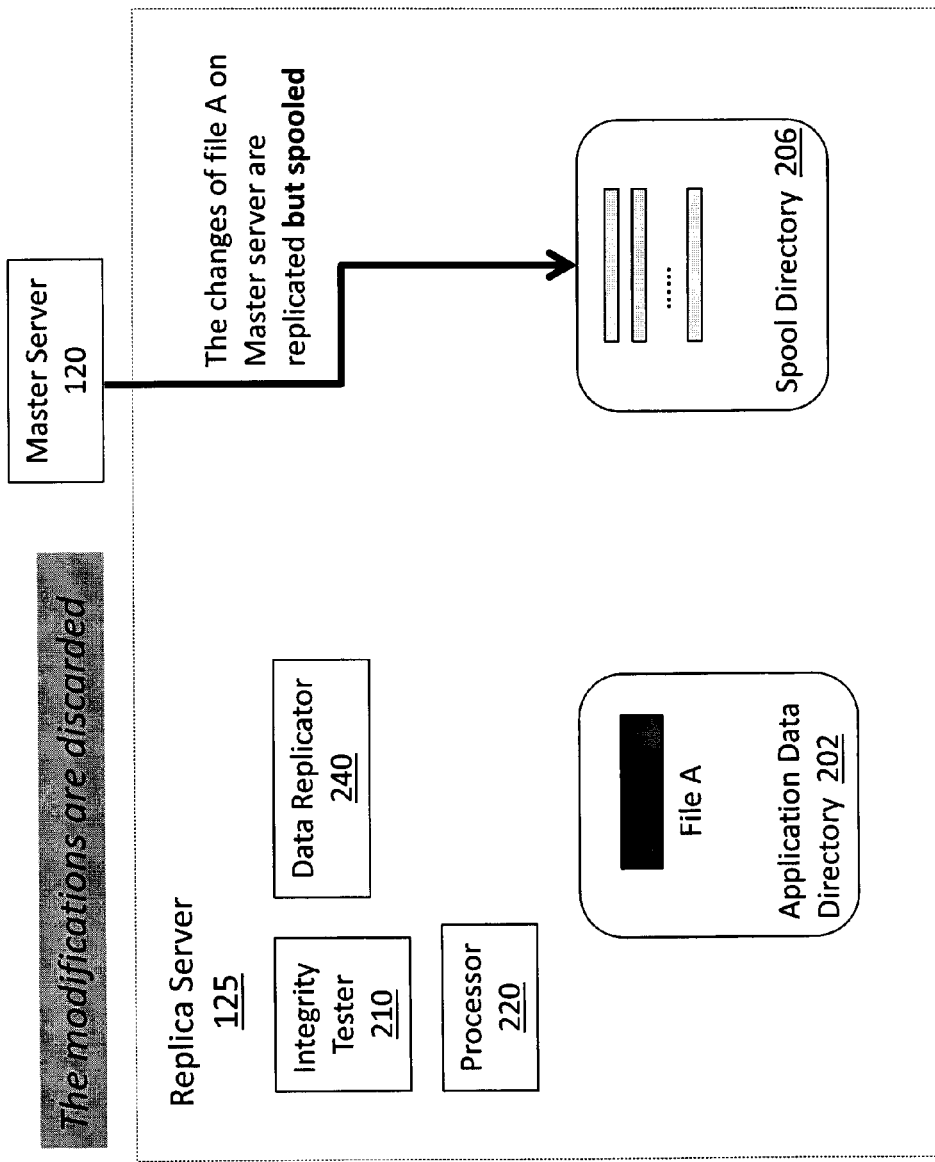

In some implementations after testing is completed, integrity tester 210 may unload/unmount the file system filter driver 230. Integrity tester 210 may discard the modified data in temporary directory 204, and may remove the temporary directory 204, as depicted in FIG. 2d, for example. The replicated application data (for example, file A) in application data directory 202 may be in its pre-test state because, during integrity testing, neither any changes made to the application data on master server have been applied to the application data directory 202, nor any data modifications to the replicated application data stored in application data directory 202 that occur due to the execution of testing logic have been applied to the application data directory 202. In other words, neither the changes in the spool directory 206 or the temporary directory 204 have been applied to the replicated application data in application data directory 202, thereby ensuring that no changes are made to the replicated application data that is being accessed during testing. Integrity tester 210 may build a snapshot (shadow copy) of the tested replicated application data in application data directory 202. Integrity tester 210 may store the snapshot in a database (not shown) communicatively coupled to the replica server 125.

Figure 2E:
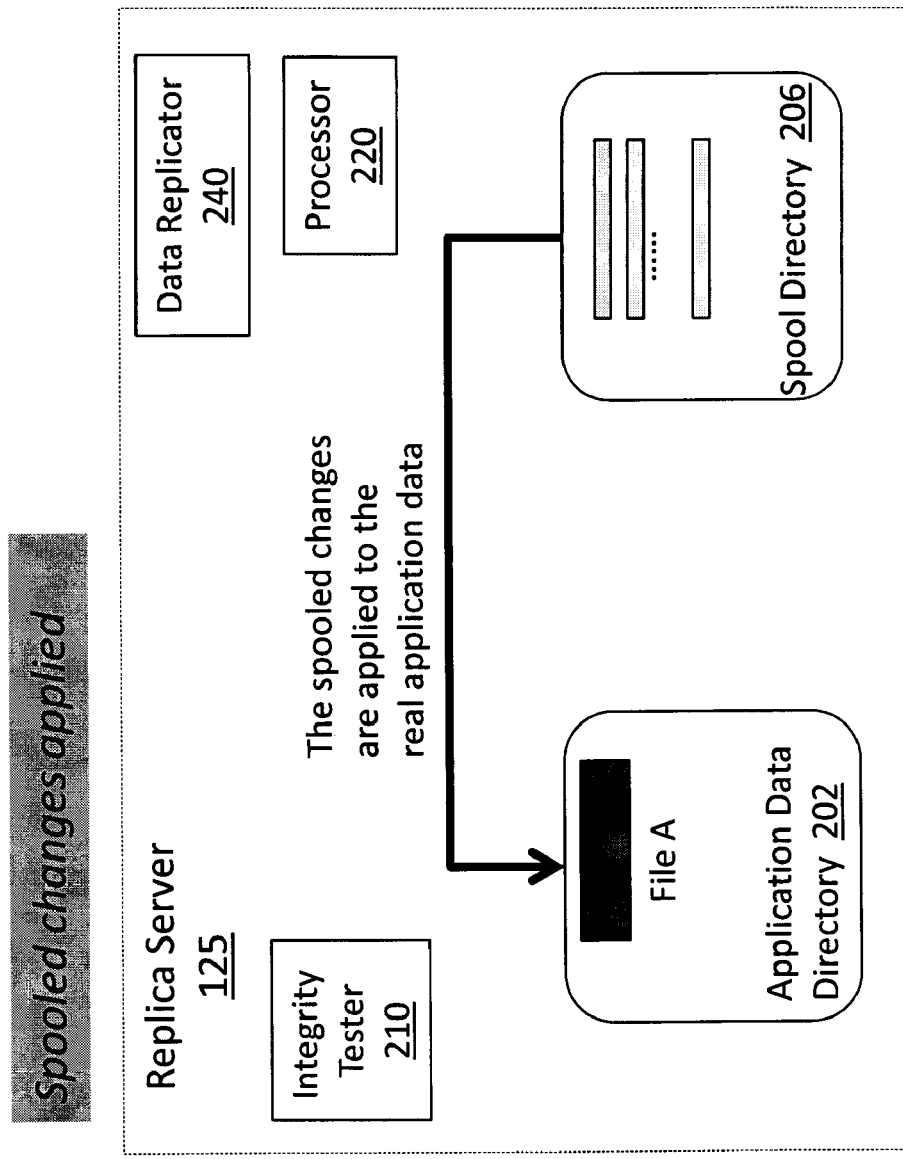
Figure 2F:
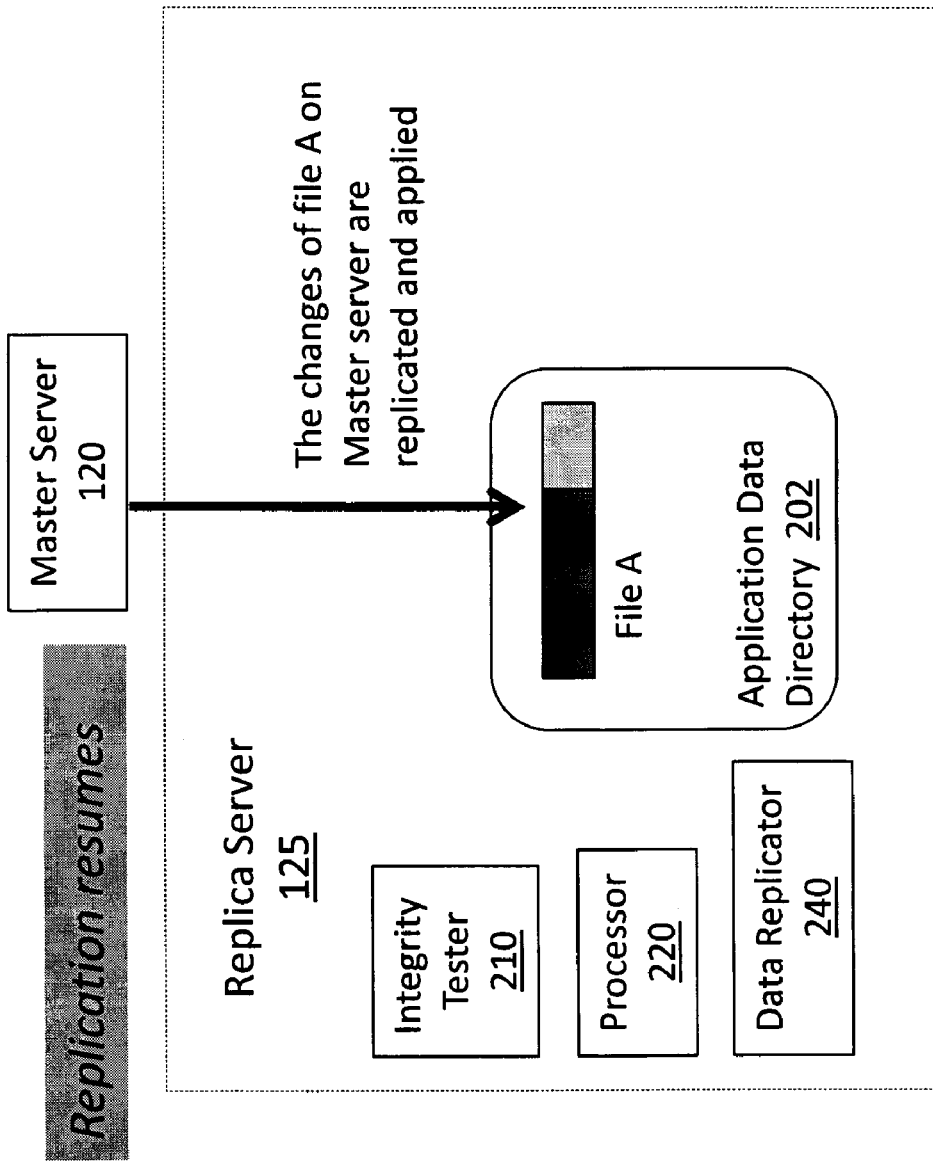

In some implementations, integrity tester 210 may stop the application/application services on replica server 125. The spooled data changes in spool directory 206 may be applied to the application data in application data directory 202, as depicted in FIG. 2e, for example. The spooled data changes may be applied by data replicator 240. Data replication may then resume wherein any changes to application data on master server 120 are replicated and applied to application data directory 202 by data replicator 240, as depicted in FIG. 2f, for example.

The integrity testing may be initiated automatically and periodically, or may be initiated manually at particular times. For example, the next time integrity testing is initiated, the procedure described in FIGS. 2b-2f may be implemented again, but with the most current replicated application data in application data directory 202. In some implementations, each time integrity testing is performed, a new snapshot may be created and stored. When master server 120 fails, the most recently created snapshot may be utilized to recover the application.

Figure 3:
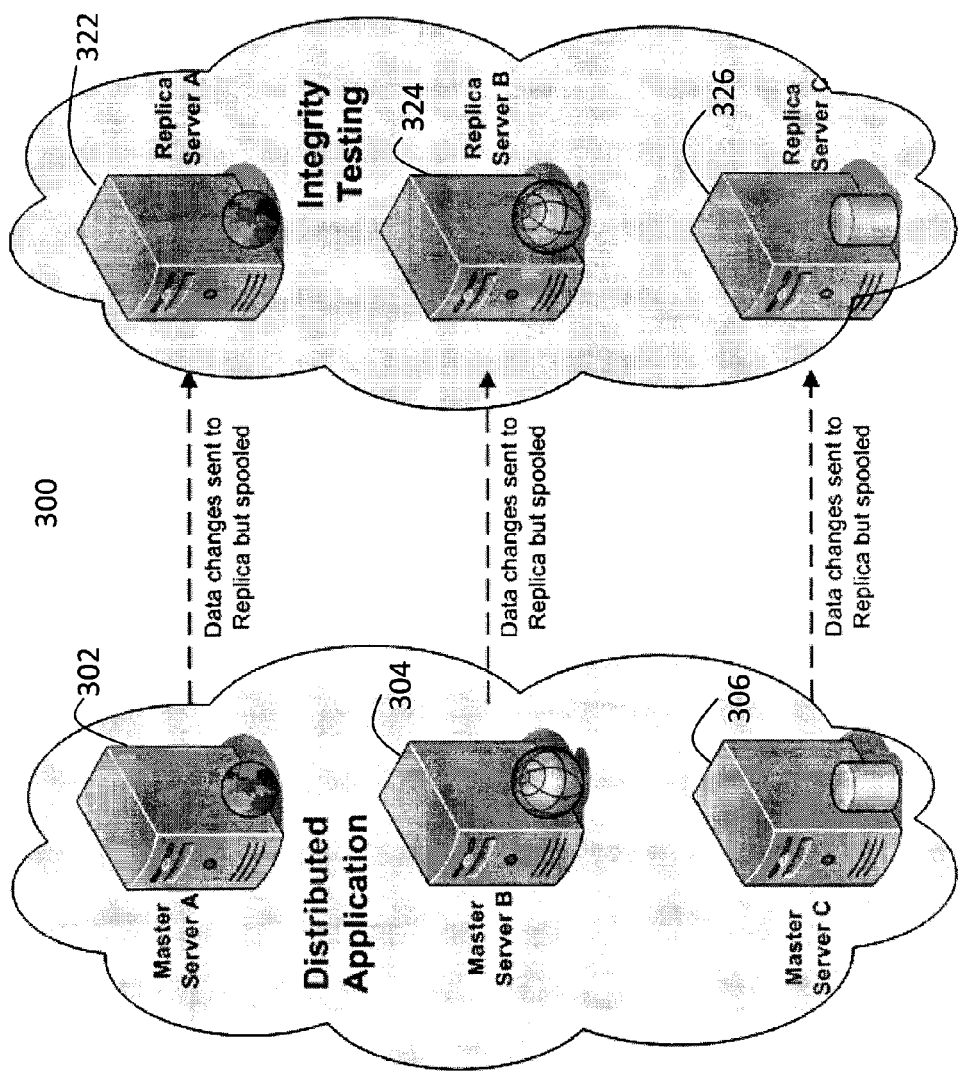
FIG. 3 depicts an exemplary disaster recovery or high availability system for a distributed application, according to various aspects of the invention.

FIG. 3 illustrates a disaster recovery (DR) or high availability (HA) system 300 for providing assured recovery for a distributed application (for example, a SharePoint application). System 300 may include at least two master servers and at least two replica servers. System 300, as depicted in FIG. 3, includes a three-server distributed application. However, it will be understood that any other type of distributed application and any number of servers may be used in the system without departing from the scope of the invention.

For example, system 300 may include master servers 302, 304, 306 and replica servers 322, 324, 326. Master servers 302, 304, 306 may be any physical or virtual servers that are configured to host/execute/run one or more components of a distributed application. For example, for a distributed SharePoint application, master server 302 may be a web front-end server, master server 304 may be an application server, and master server 306 may be a database server. In some implementations, a distributed application may include a web application component that provides a web (i.e., internet) interface executing on the web front-end server. In some implementations, the distributed application may include an application that processes requests from the web application component and executes on the application server. In some implementations, the distributed application may include a database interface component that interrogates a database in response to the application that processes requests from the web server and executes on the database server. The foregoing examples are non-limiting and are illustrative only. As would be appreciated, components of the distributed application may include any portion of the distributed application that executes on distributed or otherwise-different computing devices. Master servers 302, 304, 306 may transfer changes of application data as they occur to corresponding replica servers 322, 324, 326. This ensures integrity of replicated data, including emails, database updates, file operations, and/or other content. Thus, by replicating data and processing replicated data across a plurality of master servers 302, 304, 306 and a plurality of corresponding replica servers 322, 324, 326, various implementations of the invention may facilitate assured recovery/high availability of a distributed application. Replica servers 322, 324, 326 may be located nearby on the same subnet or at any distance over a WAN (wide area network) or other network communication link.

In some implementations, each master server 302, 304, 306 and replica server 322, 324, 326 may include a processor, circuitry and/or other hardware operable to execute computer-readable instructions. According to one aspect of the invention, system 300/servers 302, 304, 306, 322, 324, 326 may include one or more tangible computer-readable storage media configured to store one or more software agents/modules, wherein the software agents/modules include computer-readable instructions that when executed by the processor cause the processor to perform the functions described herein. According to one implementation, each replica server 322, 324, 326 may comprise computer hardware programmed with a computer application having one or more of the software modules, depicted in FIGS. 2a-2f, for example. In other words, each replica server 322, 324, 326 may include one or more of an integrity tester, a file system filter driver, a data replicator, and/or other software modules.

In some implementations, each replica server 322, 324, 326 may individually perform the replication and integrity testing procedure described in FIGS. 2a-2f to assist with recovery of the corresponding master server 302, 304, 306 in case of failure (for example, hardware failure of the corresponding master server) or other outage (for example, planned downtime). However, for a distributed application, all the replica servers 322, 324, 326 may need to be coordinated such that each of the replica servers may perform integrity testing at substantially the same time. Integrity testing for the distributed application may bring up the application component and services associated with the application component on each replica server 322, 324, 326 to simulate a substantially similar environment as the master servers 302, 304, 306, and may then perform testing to check if the application component/application component service is working well with the latest replicated application data. In other words, testing to check whether the application component/application component service is "working well" includes determining whether the first component of the distributed application is functioning substantially the same on the first replica server 322 as on the first master server 302 using the first replicated data at the first replica server 322, the second component of the distributed application is functioning substantially the same on the second replica server 324 as on the second master server 304 using the second replicated data at the second replica server 324, and so on. It will be noted that application and application component have been user interchangeably in the context of a distributed application.

Figure 4:
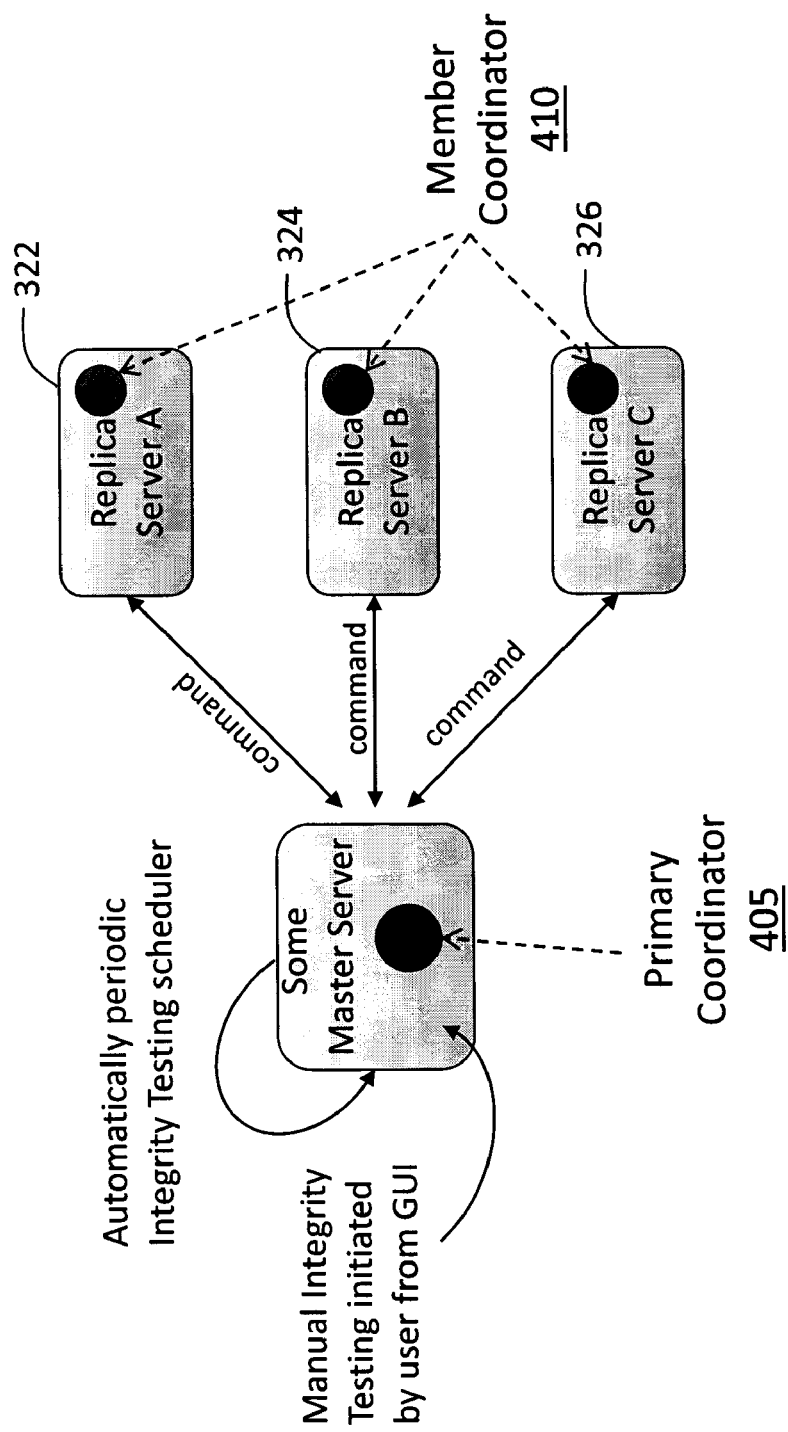
FIG. 4 depicts an exemplary primary coordinator and exemplary member coordinators, according to various aspects of the invention.

In some implementations, a central management module, which may be referred to as a distributed integrity testing coordinator, may implement central management logic to coordinate all replica servers 322, 324, 326 to perform integrity testing together for the whole distributed application. From a user's point of view, these replica servers 322, 324, 326 act as a logical unit just like integrity testing were being performed on a standalone application. The distributed integrity testing coordinator may have two roles, one of a primary coordinator 405 and the other of a member coordinator 410, as depicted in FIG. 4, for example. Primary coordinator 405 may be deployed on one of the master servers 302, 304, 306, or any other master server (as long as the master server hosts/runs a component of the same distributed application as the master servers 302, 304, 306). Each replica server 322, 324, 326 may deploy member coordinator 410. Any one of master servers 302, 304, or 306, and each replica server 322, 324, 326 may include one or more tangible computer-readable storage media configured to store one or more coordinators, wherein the coordinators include computer-readable instructions that when executed by the corresponding processors associated with the servers cause the processors to perform the functions described herein.

In some implementations, system administrators (or other users) may interact with system 300 via one or more client devices (not shown). The client devices may each comprise a user interface/graphical user interface (GUI) that may enable users to perform various operations that may facilitate interaction with system 300. For example, integrity testing for a distributed application may be manually initiated by a user via the user interface. Each client device may include a processor, circuitry, and/or other hardware operable to execute computer-readable instructions.

In one implementation, integrity testing for a distributed application may be initiated automatically and periodically. For example, users may pre-configure intervals at which the integrity testing is to be performed, and the integrity testing may be automatically initiated at those pre-configured intervals.

In one implementation, primary coordinator 405 may communicate with each member coordinator 410, and may provide integrity testing commands to each member coordinator 410 that request the member coordinators to perform one or more operations associated with the integrity testing procedure. For example, the integrity testing procedure for the distributed application may include, among others, the following integrity testing operations that may be performed on each replica server 322, 324, 326.

In some implementations, a pre-testing condition check (or verification) operation may be performed at each replica server. The pre-testing condition check may be relevant to the type of distributed application on which integrity testing is to be performed. Primary coordinator 405 may send a command to each member coordinator 410 to perform the pre-testing condition check. Each member coordinator 410 may receive the command from the primary coordinator 405 and may perform the pre-testing condition check that may include one or more checks, for example, checks to determine if the application is installed on the replica server with the same version and patches as the master server, checks to determine if the configuration of the application on the replica server is the same as the configuration of the application on the master server, and/or other application specific checks.

In some implementations, once integrity testing is triggered/initiated, a replication spooling operation may be performed. Primary coordinator 405 may send a command to each member coordinator 410 to spool any changes made to the application data on the corresponding master server. Each member coordinator may receive the command and may communicate with the corresponding data replicator on each replica server to ensure that the changes are spooled. The changes from each master server may be replicated to the corresponding replica server, but may be spooled in a temporary spool directory at the replica server that is separate from the application data directory at the replica server that stores the replicated application data that is accessed during testing. This may ensure that any application data changes that occur on master servers 302, 304, 306 after the integrity testing is initiated does not impact the replica server testing environment.

In some implementations, primary coordinator 405 may send one or more commands (simultaneously or in sequence) to each member coordinator 410 to perform one or more operations of: mounting a file system filter driver on the replica server (to prevent replicated data on the replica server from being changed by the application during testing), creating a temporary directory on the replica server (to store any data modifications made to the replicated application data in the replica server due to execution of testing logic), starting the application and the services associated with the application on the replica server, and executing testing logic to verify if the application is functioning well on the replica server. Each member coordinator 410 may receive the command and may communicate with the integrity tester on each replica server to ensure that the mounting, creating, starting, and executing operations are correspondingly performed.

In some implementations, the testing logic for integrity testing of a distributed application may be relevant to the type of distributed application for which integrity testing is being performed. For example, for a SharePoint distributed application, the testing logic may include, among other things, checks to determine if the SharePoint website is online, checks to determine if the SharePoint server roles can be successfully queried, checks to determine if the SharePoint search function is working fine or not, and/or other application specific checks. The testing logic for a distributed application may include a first part that is individual server specific wherein all the testing functions may be performed within the server itself, and a second part that may involve two or more servers which may cooperate with each other to complete the testing functions. Unlike testing logic for a standalone application which may only include an individual server specific component, both the testing logic parts (individual and multi-server parts) may be implemented for a distributed application to achieve integrity testing for the distributed application. A common framework and interfaces may be provided to call both these testing logic parts during testing of the distributed application.

In some implementations, once execution of testing logic is completed, a snapshot building operation may be performed. Primary coordinator 405 may send a command to each member coordinator 410 to build a snapshot (shadow copy) of the tested replicated application data associated with the application. Each member coordinator may receive the command and may communicate with the corresponding integrity tester on each replica server to ensure that the snapshots are built and stored.

In some implementations, primary coordinator 405 may send one or more commands (simultaneously or in sequence) to each member coordinator 410 to perform one or more operations of: stopping the application/application services on the replica server, discarding any data modifications in the temporary directory on the replica server, removing the temporary directory from the replica server, and unmounting the file system filter driver from the replica server. Each member coordinator 410 may receive the command and may communicate with the integrity tester on each replica server to ensure that the stopping, discarding, removing, and unmounting operations are correspondingly performed. In one implementation, the member coordinator 410 may execute the stopping, discarding, removing, and unmounting operations in sequence.

In some implementations, primary coordinator 405 may send a command to each member coordinator 410 to apply the spooled changes to the application data in the application data directory at the replica server. Each member coordinator 410 may receive the command and may communicate with the data replicator on each replica server to ensure that the spooled changes are applied.

At this stage, the integrity testing may be completed and results may be generated. In some implementations, it may be determined whether the distributed application may be recovered based on one or more of the above-mentioned operations performed at the replica servers. In one implementation, a determination may be made that the distributed application may be recovered. In response to this determination, the built snapshot may be used to recover the distributed application in case of failure or other outage. In one implementation, a determination may be made that the distributed application may not be recovered. In response to this determination, a notification to a user or other entity may be generated to indicate that the integrity testing procedure has failed and the distributed application may not be recovered.

In one implementation, each of the above described operations associated with the integrity testing procedure may be executed on each replica server 322, 324, 326. To achieve integrity testing for a distributed application, the primary coordinator and member coordinators may communicate with one another to ensure that all the replica servers execute each operation at the same time and that a next operation can only be performed when all the replica servers have completed the current operation. In one implementation, member coordinators may send notifications to the primary coordinator when they finish performing a particular operation. Once the primary coordinator receives notifications from all the member coordinators indicating that the particular operation has been finished by each of the member coordinators, the primary coordinator may then send a next command to the member coordinators to perform a next operation.

Figure 5:
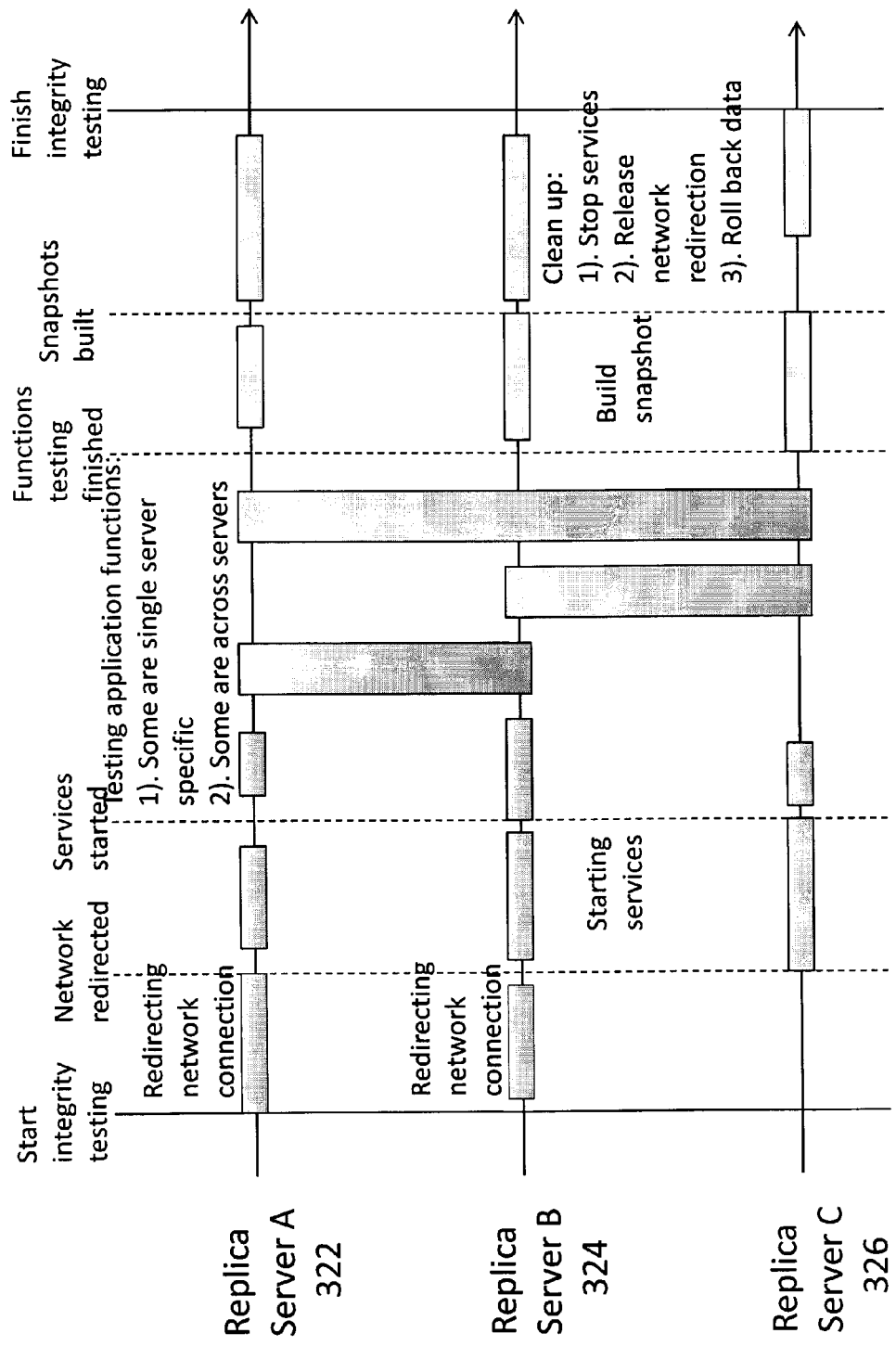
FIG. 5 depicts an exemplary sequence describing execution of integrity testing operations and commands between primary coordinator and member coordinators, according to various aspects of the invention.

FIG. 5 illustrates an exemplary sequence describing execution of integrity testing operations and commands between primary coordinator and member coordinators, according to various aspects of the invention. In some implementations, the example operations may be performed by one or more modules described herein. In some implementations, various operations may be performed in different sequences. In other implementations, additional operations may be performed along with some or all of the operations shown in FIG. 5. In yet other implementations, one or more operations may be performed simultaneously. In yet other implementations, one or more operations may not be performed. Accordingly, the operations and sequence of operations described are exemplary in nature and, as such, should not be viewed as limiting.

At the point of each vertical line depicted in FIG. 5, the primary coordinator may send commands to each member coordinator at each replica server to perform one or more operations associated with the integrity testing procedure described above or the primary coordinator may receive notifications from each member coordinator at each replica server indicating that the one or more operations have been completed. When all the member coordinators have completed the operations, the primary coordinator may request the member coordinators to perform the next operation and may wait for their responses/notifications.

FIG. 5 depicts an operation of "redirecting network connection" that may be performed by member coordinators 410. Primary coordinator 405 may send commands to member coordinators 410 to perform this operation. This operation may ensure that all replica servers will connect to each other, instead of the master servers, during integrity testing.

In one implementation, replica servers 322, 324, 326 may simulate substantially the same environment as the environment of master servers 302, 304, 306. In other words, replica servers 322, 324, 326 may start the application/application services and connect to each other rather than to master servers 302, 304, 306. Under "normal operation," (i.e., operation of distributed application in which integrity testing is not performed, such as operation that would be expected in a production environment), replica servers 322, 324, 326 may replicate data for corresponding ones of master servers 302, 304, 306. Also during normal operation, replica servers 322, 324, 326 may connect to or otherwise communicate with master servers 302, 304, 306. However, when an indication to initiate integrity testing is received, replica servers 322, 324, 326 may connect to one another rather than to master servers 302, 304, 306 in order to simulate the "production server farm" (discussed below) of master servers 302, 304, 306 without interrupting or otherwise interfering with operation of the production server farm during integrity testing. This may prevent replica servers 322, 324, 326 from accessing and/or changing application data on the master servers 302, 304, 306 during integrity testing; may guarantee that the entity of replica servers 322, 324, 326 is a copy of the master servers 302, 304, 306, thereby assuring recovery integrity for various components of the distributed application; and/or may guarantee that various components of the distributed application operate as expected after recovery from these replica servers as a logical unit.

Figure 6:
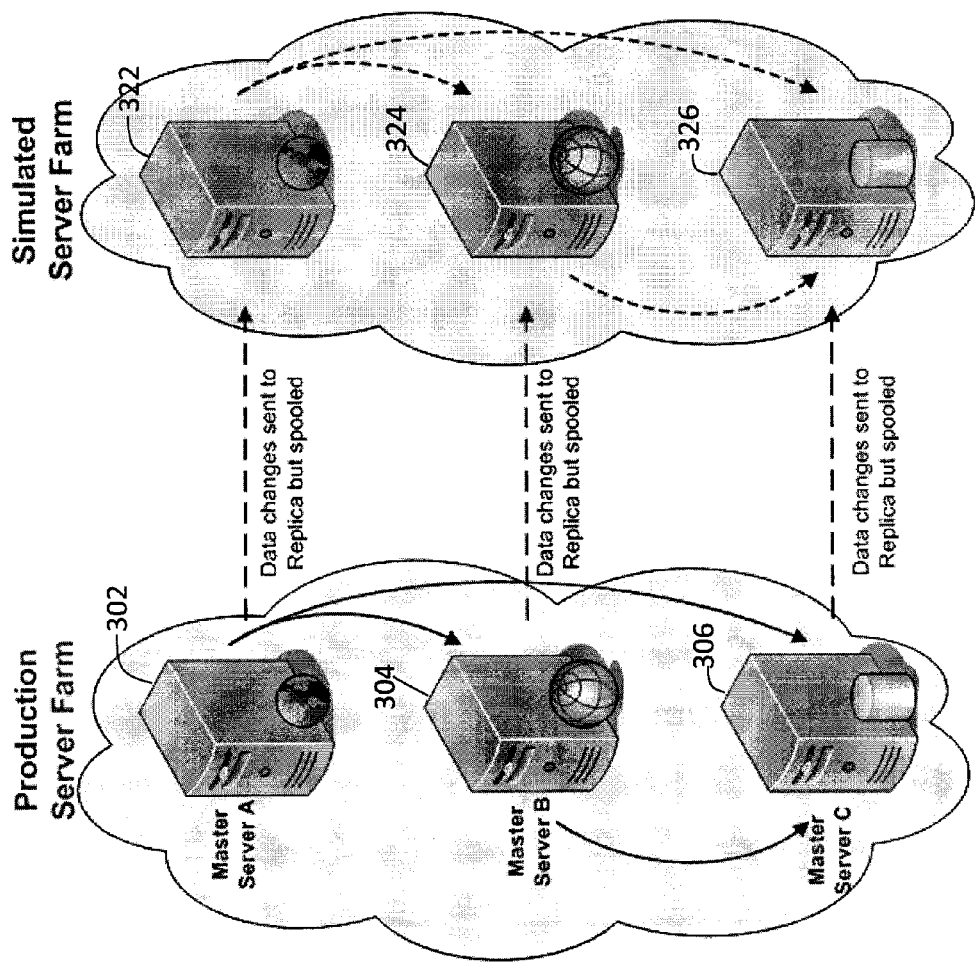
FIG. 6 depicts exemplary production server and simulated server farms, according to various aspects of the invention.

As previously noted, master servers 302, 304, 306 of a distributed application may be referred to as a production server farm, as depicted in FIG. 6, for example. A server farm may be defined as a collection of networked servers which work together to provide server-side resources that an organization requires. Server farms may provide a more scalable and flexible alternative to upgrading existing servers by adding hardware to respond to increased workloads and changing user requirements. To ensure that all replica servers 322, 324, 326 can work together in the same manner as the master servers 302, 304, 306, the replica servers may be simulated to serve as a logical unit (which may be referred to as a "simulated server farm").

Generally, each master server (and therefore its corresponding replica server) of a distributed application may know all the other servers of the distributed application. For example, master servers 302, 304, 306 may know each other so that they can properly connect to the other servers to perform requested actions. Information regarding the servers associated with the distributed application may be replicated to replica servers 322, 324, 326. In one implementation, a list of servers associated with the distributed application may be maintained that includes configuration information associated these servers, and this list may be queried by any server to obtain configuration information associated with any other server. Server 302 may retrieve (from the list) configuration information associated with server 304 of the distributed application because server 302 may need to connect to server 304 to respond to or satisfy a client request. A data connection between the servers may be a read/query operation or write/update operation. To prevent replica servers 322, 324, 326 from connecting to master servers 302, 304, 306 and possibly changing the distributed application's data, the replica servers may connect to each other in a similar manner as the connection among the master servers. Within the simulated server farm, all the replica servers may connect to each other, as depicted in FIG. 6, for example. This means that any data access request during integrity testing may be confined to the simulated server farm zone and may not access the production server farm. In FIG. 6, the solid lines in production server farm may indicate a data connection among the master servers. The dotted lines in the simulated server farm may indicate a data connection among the replica servers during integrity testing.

In order to create a simulated server farm environment, the network resources (i.e., IP address, DNS record, host name, etc.) from the master servers cannot be applied to the replica servers, because these resources are being used on the master servers to provide functions of the distributed application to an organization's clients. However, a connection request may be redirected from a master server to its corresponding replica server. For example, when replica server 322 tries to connect to master server 304 (note that master server 302 stores the master server 304's name which is then synchronized to replica server 322, which is why replica server 322 thinks itself as master server 302 and tries to access master server 304), it is actually connecting to replica server 324.

In some implementations, two or more types of data sources may be accessed by a replica server during integrity testing. In some implementations, redirecting the connection request may be performed differently for the different types of data sources. For example, a first type includes data at the master server that is replicated at the replica server. A second type includes data associated with an application service executing on the master server but not executing on the replica server.

In some implementations, a temporary server alias for the connection may be created to address the first type of data source. For example, the server's redirection may be implemented by modifying the contents of system host files (for example, C:\Windows\System32\drivers\etc\*hosts). Thus, for the first type of data source, which involves data only, redirecting to a location where the data exists may be sufficient.

Figure 7:
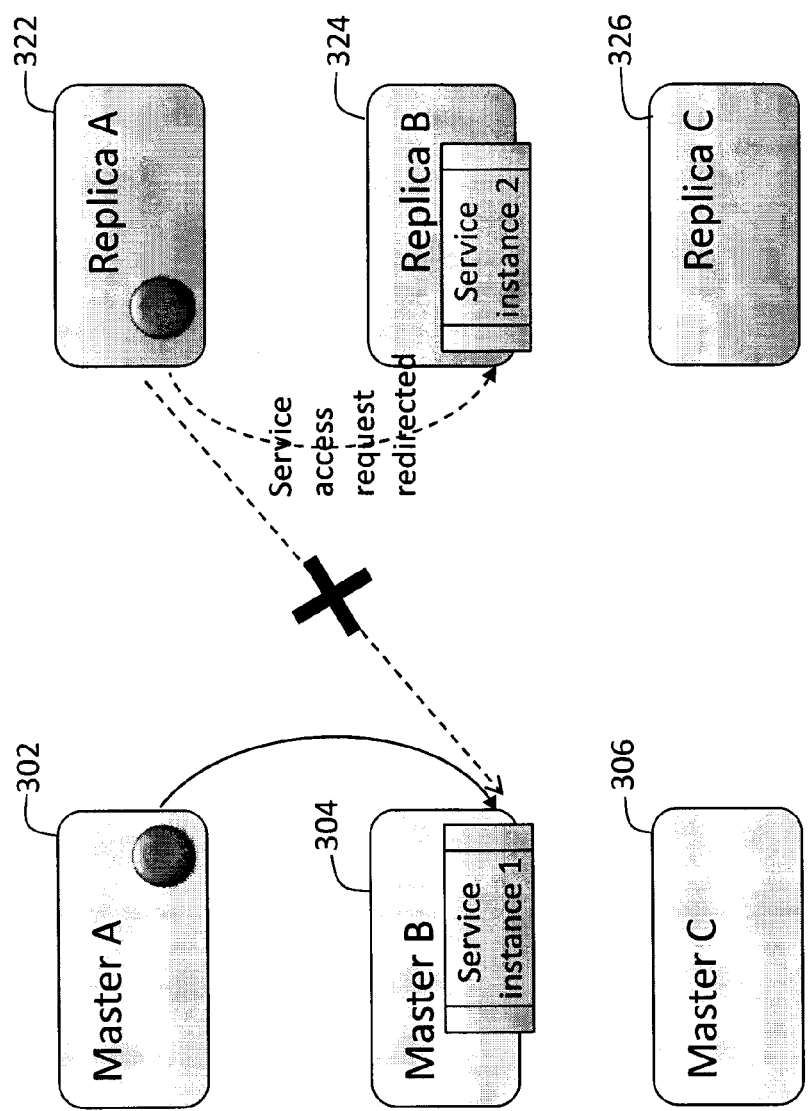
FIG. 7 depicts an exemplary scenario for configuring a service instance on the replica server and for redirecting connection requests, according to various aspects of the invention.

In some implementations, the application services (or instances) executing on the master server may be configured on the replica server to satisfy the request for the second type of data source. The service/instance started on the replica server may have identical configurations and data as that on the master server, which guarantees that the client will be presented with an unchanged result. FIG. 7, for example, depicts a scenario for configuring a service instance on the replica server and for redirecting connection requests. Master server 304 may host an application instance (for example service instance 1) and master server 302 may need to access it. In a simulated server farm environment, the replica server 322 may try to connect to master server 304, which is undesirable. However, when replica server 322 tries to connect to master server 304, another application instance (for example service instance 2) may be configured on replica server 324, and the connection request may be redirected from master server 304 to replica server 324. This second case may be related to the specific distributed application. A common framework may be provided and a set of interfaces may be defined for the distributed application. Any other supported distributed application may need to implement its own special service instance configuration logic.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for providing assured recovery for a distributed application, the method comprising:

replicating first data associated with a first master server at a first replica server, wherein the first master server is configured to host a first component of the distributed application;

replicating second data associated with a second master server at a second replica server, wherein the second master server is configured to host a second component of the distributed application;

in response to a request to initiate integrity testing, performing one or more operations at the first replica server to determine whether the first component of the distributed application is functioning the same on the first replica server as on the first master server using the first replicated data at the first replica server;

performing the one or more operations at the second replica server to determine whether the second component of the distributed application is functioning the same on the second replica server as on the second master server using the second replicated data at the second replica server;

coordinating the one or more operations performed at the first replica server and the second replica server by generating a first notification and a second notification, wherein the first notification is generated by the first replica server and the second notification is generated by the second replica server, and wherein the first notification and the second notification indicate completion of a first operation by the first replica server and the second replica server;

performing a second operation by the first replica server and the second replica server, wherein the second operation is performed after the completion of the first operation, wherein the second operation comprises a first testing operation and a second testing operation, wherein the first testing operation performs testing functions associated with the first replica server or the second replica server, and the second testing operation performs testing functions associated with the first replica server and the second replica server; and determining whether the distributed application can be recovered based on the one or more operations performed at the first and second replica servers.

2. The method of claim 1, wherein each operation of the one or more operations is performed at the first replica server and the second replica server substantially simultaneously.

3. The method of claim 1, wherein the first replicated data at the first replica server comprises data that exists at the first replica server at the time the request to initiate integrity testing is received and the second replicated data at the second replica server comprises data that exists at the second replica server at the time the request to initiate integrity testing is received.

4. The method of claim 1, wherein the one or more operations include performing a pre-testing verification check associated with the distributed application at the first replica server and the second replica server.

5. The method of claim 1, wherein the one or more operations include spooling a set of replicated data received from the first master server and the second master server at the corresponding replica servers, wherein the set of replicated data is not used during integrity testing.

6. The method of claim 5, wherein the spooled set of replicated data is stored in a temporary location that is separate from a location where the first replicated data and the second replicated data are stored at the first replica server and the second replica server, respectively.

7. The method of claim 1, wherein the one or more operations include mounting a file system filter driver on the first replica server and the second replica server.

8. The method of claim 1, wherein the one or more operations include starting one or more application services on the first replica server and the second replica server, wherein the one or more application services on each replica server are associated with components of the distributed application hosted on the respective master server.

9. The method of claim 8, wherein the one or more operations include executing logic to test the application services started on the first replica server and the second replica server.

10. The method of claim 1, wherein the one or more operations include building a snapshot associated with tested replicated data on the first replica server and the second replica server.

11. The method of claim 10, further comprising:
in response to an indication of failure or outage, recovering the distributed application using the built snapshot.

12. The method of claim 1, wherein the first operation comprises a redirecting network connection operation, and wherein the second operation is different than the first operation.

13. The method of claim 1, wherein the second operation comprises a testing application functions operation including the first testing operation and the second testing operation, and wherein the second operation is different than the first operation.

14. A system for providing assured recovery for a distributed application, the system comprising:
at least two master servers, wherein each master server of the at least two master servers is configured to host one or more components of the distributed application;
at least two replica servers, wherein a first replica server is configured to replicate first data from a first master server and a second replica server is configured to replicate second data from a second master server;
wherein in response to a request to initiate integrity testing,
a processor of the first replica server is configured to perform one or more operations to determine whether a first component of the distributed application is functioning the same on the first replica server as on the first master server using the first replicated data at the first replica server;
a processor of the second replica server is configured to perform the one or more operations to determine whether a second component of the distributed application is functioning the same on the second replica server as on the second master server using the second replicated data at the second replica server, wherein the one or more operations are coordinated at the first and second replica servers by generating a first notification and a second notification;
the processor of the first replica server is configured to provide the first notification and the processor of the second replica server is configured to provide the second notification, wherein the first notification and the second notification indicate completion of a first operation by the first replica server and the second replica server; and
the processor of the first replica server and the processor of the second replica server are configured to perform a second operation after the completion of the first operation, wherein the second operation comprises a first testing operation and a second testing operation, wherein the first testing operation performs testing functions associated with the first replica server or the second replica server, and the second testing operation performs testing functions associated with the first replica server and the second replica server,
wherein a determination of whether the distributed application can be recovered is made based on the one or more operations performed at the first and second replica servers.

15. The system of claim 14, wherein each operation of the one or more operations is performed at the first replica server and the second replica server substantially simultaneously.

16. The system of claim 14, wherein the request is a user request to initiate integrity testing.

17. The system of claim 14, wherein the request is a preconfigured periodic system request to initiate integrity testing.

* * * * *